(12) United States Patent
Kato et al.

(10) Patent No.: US 6,554,112 B2
(45) Date of Patent: Apr. 29, 2003

(54) VIBRATION-DAMPING DEVICE FOR VEHICLE

(75) Inventors: Rentaro Kato, Kasugai (JP); Koichi Hasegawa, Kasugai (JP); Hajime Maeno, Kasugai (JP); Masaaki Hamada, Kounan (JP); Yuushi Hashimoto, Iwakura (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/925,169

(22) Filed: Aug. 8, 2001

(65) Prior Publication Data

US 2002/0030315 A1 Mar. 14, 2002

(30) Foreign Application Priority Data

Sep. 8, 2000 (JP) .......................... 2000-273135
Mar. 7, 2001 (JP) .......................... 2001-064043

(51) Int. Cl.$^7$ ................................. F16F 7/10
(52) U.S. Cl. ................. 188/379; 188/378; 267/136; 267/292
(58) Field of Search ................ 267/141, 136, 267/153, 292; 188/378, 379; 248/560, 632, 634

(56) References Cited

U.S. PATENT DOCUMENTS

| | | | | |
|---|---|---|---|---|
| 2,349,187 A | * | 5/1944 | Meyer ........................ 188/322.5 |
| 2,462,961 A | * | 3/1949 | Harker ........................ 188/266 |
| 2,714,161 A | | 7/1955 | Featherstun | |
| 3,432,127 A | * | 3/1969 | Philipp ........................ 267/153 |
| 3,612,222 A | | 10/1971 | Minor | |
| 4,018,454 A | | 4/1977 | Burkart ........................ 780/602 |
| 4,527,951 A | * | 7/1985 | Trier ........................ 416/145 |
| 5,180,147 A | * | 1/1993 | Andersson et al. ......... 267/136 |
| 6,125,977 A | * | 10/2000 | Nekomoto et al. ......... 188/378 |

FOREIGN PATENT DOCUMENTS

| | | |
|---|---|---|
| DE | DT 2350656 | 9/1973 |
| DE | 3410874 | 3/1985 |
| JP | 125878 | 12/1937 |
| JP | 57-52305 | 3/1982 |
| JP | 64-42591 | 3/1989 |
| JP | 3-86227 | 8/1991 |
| JP | 4-46246 | 4/1992 |
| JP | 9-329182 | 12/1997 |
| WO | WO00/14429 | 12/1998 |
| WO | WO00/14429 | 3/2001 |

OTHER PUBLICATIONS

Translation of the Official Letter dated Aug. 20, 2002.
WIPO, International Published Application No. WO 00/14429 (Dec. 1998).

* cited by examiner

*Primary Examiner*—Matthew C. Graham
*Assistant Examiner*—Mariano Sy
(74) *Attorney, Agent, or Firm*—Beyer Weaver & Thomas, LLP

(57) ABSTRACT

A vibration-damping device for damping vibrations of a vibrative member of a vehicle, including: a mass member disposed in the vibrative member such that the mass member is non-adhesive to and is displaceable independent of and relative to the vibrative member; the mass member and the vibrative member being brought into impact against with each other at their abutting portions. At least one of the abutting portions of the mass member and the vibrative member is formed of an elastic member adapted to undergo shear deformation in a direction in which the mass member and vibrative member are brought into impact against each other.

15 Claims, 3 Drawing Sheets

VIBRATION-DAMPING DEVICE FOR VEHICLE

This application is based on Japanese Patent Application Nos. 2000-273135 filed Sep. 8, 2000 and 2001-064043 filed Mar. 7, 2001, the contents of which are incorporated hereinto by reference in their entireties.

BACKGROUND OF THE INVENTION

1. Field of the Invention

The present invention generally relates to a vibration-damping device installed in a vibrative member of a vehicle, for reducing or attenuating vibration of the vibrative member. More particularly, the present invention is concerned with such a vibration-damping device which is novel in construction and which is suitably applicable to vibrative members of an automotive vehicle, such as a suspension member, a sub frame, a body panel, a mounting bracket, and a vibrative member or members used in an engine unit or an exhaustion system, so that the vibration-damping device exhibits an excellent damping effect with respect to vibrations excited in these vibrative members.

2. Description of the Related Art

As vibration-damping devices for damping or reducing vibration excited in vehicles such as an automotive vehicle, there are known (a) a mass damper wherein a mass member is fixed to a vibrative member, (b) a dynamic damper wherein a mass member is supported by and connected to the vibrative member via a spring member and (c) a damping material which is a sheet-shaped elastic member and secured to the vibrative member. However, these conventional devices suffer from various potential problems. For instance, the mass damper and the dynamic damper both require a relatively large mass of the mass member, and exhibit desired vibration damping effect with respect only to a considerably narrow frequency range. The damping material requires a relatively large space for its installation, and tends to be large in its weight. In addition, the dynamic damper and the damping material both suffer from difficulty in stably exhibiting desired damping effects thereof, since the damping effects of the dynamic damper and the damping material are prone to vary depending upon the ambient temperature.

The present applicant has been disclosed in International Publication No. WO 00/14429 a novel vibration damper used for an automotive vehicle, which includes a housing member having an inner space and fixed to the vibrative member, and an independent mass member which is disposed within in the inner space of the housing member with a spacing therebetween, without being bonded to the housing member, so that the independent mass member is displaceable or movable relative to the housing member. When vibrations excited in the vibrative member is applied to the vibration damper, the independent mass member and the housing member are brought into impact against each other at their elastic abutting surfaces, thereby exhibiting an vibration damping effect on the basis of loss or dissipation of vibration energy caused by sliding friction generated between the elastic abutting surfaces of the independent mass member and the housing member and caused by collision or impact of the independent mass member against the housing member. This proposed vibration damper is capable of exhibiting a high damping effect over a relatively wide frequency range of input vibrations, while assuring a relatively small mass of the independent mass member.

Extensive studies of the vibration damper disclosed in the International Publication No. WO 00/14429 by the inventors of the present invention, have revealed that the vibration damping effects of the vibration damper can be remarkably improved with respect to a specific frequency vibration by adjusting a mass of the independent mass member or a spring stiffness of the elastic abutting surface of the independent mass member and/or the housing member, for example. This might be considered as follows, according to an examination into frequency characteristics of the damping effect of the vibration damper conducted by the inventors. Namely, the impact of the independent mass member on the housing member in a vibration input direction causes a reciprocating displacement of the independent mass member relative to the housing member within the housing member. The reciprocating displacement of the independent mass member relative to the housing member due to the impact of the mass member on the housing member might exhibit an effect like resonance.

However, it is difficult to tune the vibration damper to exhibit an excellent damping effect with respect to a desired frequency vibration, owing to the resonance-like effect of the reciprocating displacement of the independent mass member. That is, tuning of the vibration damper is limited by several conditions. For instance, a size of the independent mass member is limited by a given space for installation of the vibration damper in the vehicle, while a lower limit of the spring stiffness of the elastic abutting surface of the independent mass member and/or the housing member is predetermined to ensure a desired durability of the elastic abutting surface. In particular, when a vibration to be damped has a low frequency, there are needed a relatively large mass of the mass member and a relatively small spring stiffness of the elastic abutting surface, for example. In this case, a desired tuning of the vibration damper is significantly difficult, whereby the conventional vibration damper is insufficient in its vibration damping effect with respect to vibrations within a low frequency band.

SUMMARY OF THE INVENTION

It is therefore an object of this invention to provide a vibration-damping device for a vehicle which is novel in construction and which permits sufficient durability of abutting portions of a mass member and a vibrative member, while ensuring sufficiently small spring stiffness generated in abutting portions upon impact of the mass member on the vibrative member. The vibration-damping device is easily tunable to exhibit an excellent damping effect owing to impact of the mass member on the vibrative member, with respect to input vibrations especially within a lower frequency band.

The above object may be attained according to the following modes of the invention, each of which is numbered like the appended claims and depends from the other mode or modes, where appropriate, to indicate possible combinations of elements or technical features of the invention. It is to be understood that the present invention is not limited to the following modes or combinations of technical features, but may otherwise be recognized based on the thought of the present invention that described in the whole specification and drawings or that may be recognized by those skilled in the art in the light of the disclosure in the whole specification and drawings.

(1) A vibration-damping device for damping vibrations of a vibrative member of a vehicle, comprising: a mass member disposed in the vibrative member such that the mass member is non-adhesive to and is displaceable independent of and relative to the vibrative member, the mass member and the vibrative member being brought into impact against each other at respective abutting portions thereof, at least one of the abutting portions of the mass member and the vibrative member being formed of an elastic member adapted to undergo shear deformation due to a load applied thereto in a direction in which the mass member and the vibrative member are brought into impact against each other.

In the vibration-damping device constructed according to this mode (1) of the invention, when the mass member is forced to move into and impact on the vibrative member due to vibrations excited in the vibrative member, the elastic member defining at least one of the abutting portions of the mass member and the vibrative member undergoes shear deformation. Thus, upon impact of the mass member on the vibrative member, the spring constant generated in the abutting portions of the mass member and the vibrative member can be made smaller, in comparison with the case where the elastic member is formed to undergo compression deformation upon impact of the mass member and the vibrative member. Namely, the spring constant generated in the abutting portions of the mass member and the vibrative member can be decreased without changing of elastic properties or elastic characteristics of the elastic member.

This arrangement makes it possible to tune the vibration-damping device so that the reciprocating displacement of the mass member relative to the vibrative member due to the impact of the mass member on the vibrative member exhibits its resonance-like effect in the lower frequency band, without requiring an enlargement of the mass member and without deteriorating durability of the elastic member. Thus, the vibration-damping device of this mode (1) of the invention can exhibit an excellent vibration damping effect with respect to vibrations over a wide frequency range, i.e., ranging from at around 10 Hz to 100 Hz or more, which vibrations are prone to be excited in an automotive vehicle.

Described in detail, the vibration-damping device constructed according to the mode (1) of the invention is arranged such that at least one of the abutting portions of the mass member and the vibrative member is formed to undergo shear deformation when the mass member and the vibrative member are brought into impact against each other at the abutting portions. This arrangement ensures sufficiently large amplitude of the reciprocating displacement of the mass member relative to the vibrative member, owing to the resonance-like effect of the reciprocating displacement of the mass member relative to the vibrative member, even in the case where a low frequency vibration having a relatively small vibration energy is applied to the vibration-damping device. That is, the presence of the abutting portion formed of the elastic member formed to undergo shear deformation facilitates a bouncing displacement of the mass member relative to the vibrative member. For instance, the mass member is able to bounce off the vibrative member even in the case where vibrations to be damped excited in the vibrative member has an acceleration of not greater than 1 G (a gravity acceleration). Therefore, the vibration-damping device of this mode (1) of the invention can exhibit a desired damping effect based on the impacts of the mass member on the vibrative member, with respect to small energy vibrations such as vibrations likely to be excited in the vibrative member of the vehicle.

In this mode (1) of the invention, a material of the mass member is not particularly limited, but may be preferably selected from metallic materials such as steel, so that the mass member has a required amount of mass with a relatively small size. A material of the elastic member defining the abutting portion of at least one of the mass member and the vibrative member may preferably be selected from a group consisting of a rubber elastic body, elastomers, foamed bodies of rubber or elastomers, and the like, for example.

(2) A vibration-damping device according to the above-indicated mode (1), further comprising: a rigid housing having a hollow structure and being fixedly formed in the vibrative member, the housing defining a hollow space therein and the mass member being accommodated within the hollow space with a spacing therebetween such that the mass member is non-adhesive to and is displaceable independent of and relative to the housing, the housing partially defined by the elastic member to provide an abutting portion of the housing on which the mass member is brought into impact.

In this mode (2), the use of the rigid housing having the hollow structure makes it possible to apply the vibration-damping device of the present invention to any vibrative members, irrespective of configurations of the vibrative members. Namely, the use of the housing ensures impact of the mass member and the housing at their abutting portions, irrespective of the configuration of the vibrative member. It is appreciated that since the housing is fixedly disposed in the vibrative member, the abutting portion of the housing functions as the abutting portion of the vibrative member.

The housing may be formed integrally with the vibrative member, or alternatively be formed independently of the vibrative member. In the former case, the housing is partially or entirely formed by utilizing a part of the vibrative member. In the later case, the housing is formed by another member independent of the vibrative member, and is fixed to the vibrative member. The number of mass member installed within the hollow space of the housing is not particularly limited, but may be suitably determined taken into account the size or shape of the hollow space of the housing, the mass of the vibrative member, the magnitude of vibrations to be damped and the like. That is, the housing may accommodate a single mass member, or may otherwise accommodate a plurality of mass members. The configuration of the hollow space of the housing is not particularly limited, but may be selected from a cylindrical shape, a rectangular shape, a polygonal shape, or other various kinds of shapes, for example. The configuration of the mass member may be suitably determined depending upon configuration of the hollow space of the housing, and may be selected from a solid or a hollow spherical shape, a rod shape, a plate shape or other various shapes.

(3) A vibration-damping device according to the above-indicated mode (2), wherein the mass member is mainly formed of a metallic material, and the housing having an inner surface covered with an elastic layer formed integrally with the elastic member. This arrangement makes it possible to provide the mass member which is large in mass and compact in size, and assures an elimination of a need for covering the mass member with an elastic layer, while permitting a reduction or an attenuation of noises caused by the impact of the mass member on the housing.

(4) A vibration-damping device according to the above-indicated mode (2) or (3), wherein the mass member comprises a plurality of mass members which are independent of each other and which have respective masses different from each other. This mode (4) of the invention facilitates to tune the plurality of mass members so as to have respective resonance frequencies of their reciprocating displacement relative to the housing. Thus, the vibration-damping device according to this mode (4) is able to exhibit a high damping effect with respect to vibrations within a plurality of frequency bands or over a wide frequency band, e.g., vibrations likely to be excited in the vehicle, such as engine shakes, engine idling vibrations and booming noises.

(5) A vibration-damping device according to any one of the above-indicated modes (2)–(4), wherein the mass member comprises a plurality of mass members which are independent of each other, and the housing comprises a plurality of the abutting portions on which the plurality of mass members are brought into impact, respectively, each of the plurality of the abutting portions of the housing including a first abutting part which is formed of the elastic member, the abutting parts formed of the elastic members on which the plurality of mass members are brought into impact, respectively, having different spring constants.

According to this mode (5) of the invention, the reciprocating displacements of the plurality of mass members can be easily tuned to exhibits their resonance effects with respect to different frequency bands, like in the vibration-damping device constructed according to the above-indicated mode (4). Therefore, the vibration-damping device of this mode (5) is capable of exhibiting an excellent vibration damping effect with respect to vibrations within a plurality of frequency bands or over a wide frequency band.

According to the invention, each mass member is desirably arranged to have a mass within a range of 10–1000 g, preferably 50–500 g as measured in a single body thereof. With the mass of the mass member set to 1000 g or smaller, more preferably 500 g or smaller, the mass member is prone to be excited to make its bouncing movement or displacement with ease and efficiency, upon application of the vibrational load to the vibration-damping device. With the mass of the mass member set to 10 g or larger, more preferably 50 g or larger, the vibration-damping device ensures its damping effect based on the impact of the mass member on the vibrative member.

To ensure the excellent damping effect of the vibration-damping device of the invention, the mass member is preferably arranged to be reciprocally displaceable by a distance within a range of 0.1–1.6 mm, more preferably within a range of 0.1–1.0 mm, between a first and a second abutting parts of the abutting portion of the vibrative member, which are opposed to each other in a direction in which vibrations is applied to the device. Since the range of reciprocating displacement of the mass member is held within such a significantly small length, the mass member is likely to impact against the vibrative member at opposite sides of the vibration input direction, even when the vibrations excited in the vehicle, which generally has a small amplitude, are applied to the vibration-damping device. This arrangement ensures a further excellent damping effect of the vibration-damping device with respect to the vibrations excited in the automotive vehicle.

According to the present invention, the abutting portions of the mass member and the vibrative member do not need to be formed entirely of the elastic member which undergoes shear deformation upon application of a load in a direction in which the mass member and the vibrative member impact against each other, but at least one of primary abutting parts which are opposed to each other in a direction in which a low frequency vibrations to be damped is applied to the device, may be formed of the elastic member. Preferably, the abutting portion of at least one of the mass member and the vibrative member may be entirely covered with an elastic layer, such as a rubber layer to thereby effectively preventing or reducing noises caused by the impact of the mass member on the vibrative member.

In this respect, the elastic member which at least partially constitutes the abutting portion of the mass member and/or the vibrative member, may preferably has a Shore D hardness of 80 or lower, more preferably, within a range of 20–40, as measured in accordance with ASTM method D 2240. For the above-mentioned improved damping effect and the reduced impact noise, the abutting portion of the mass member and/or the vibrative member is also arranged to have a modulus of elasticity within a range of $1-10^4$ MPa, more preferably, $1-10^3$ MPa, and a loss tangent is not less than $10^{-3}$, more preferably within a range of 0.01–10.

According to the present invention, a mass of the mass member is held within a range of 5–10% of a mass of the vibrative member, preferably. Namely, if the mass of the mass member is smaller than 5% of the mass of the vibrative member, the vibration-damping device possibly suffers from difficulty in exhibiting a desired damping effect, and if the mass of the mass member is larger than 10% of the mass of the vibrative member, the vibration-damping device suffers from a problem of increase in the overall weight of the device. If the plurality of vibration-damping devices are installed in the vibrative member, the total mass of the plurality of mass members is desirably arranged to be held within a range of 5–10% of the mass of the vibrative member.

BRIEF DESCRIPTION OF THE DRAWINGS

The above and optional objects, features advantages and technical and industrial significance of the present invention will be better understood by reading the following detailed description of the presently preferred embodiments or modes of the invention when considered in conjunction with the accompanying drawings in which.

DETAILED DESCRIPTION OF THE PREFERRED EMBODIMENTS

Figure 1:
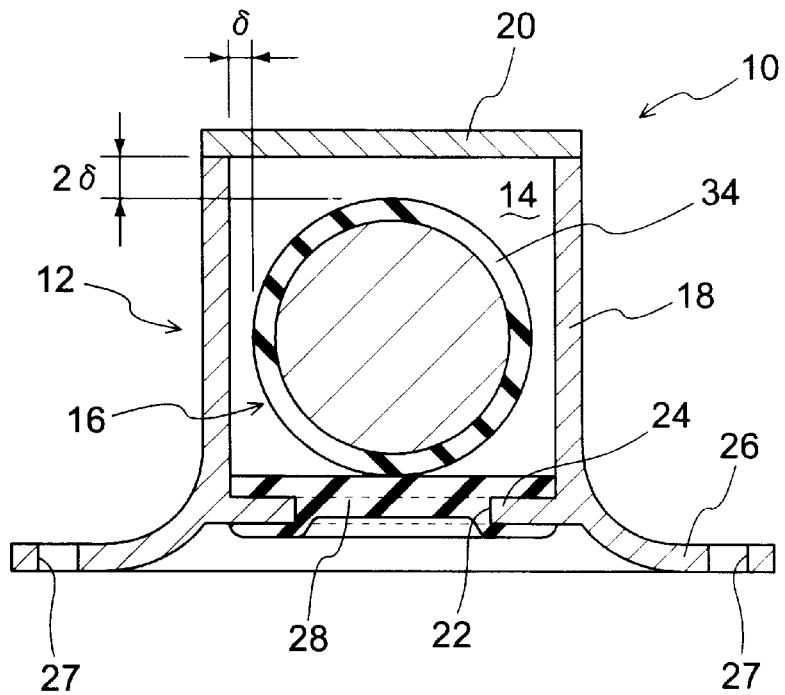
FIG. 1 is an elevational view in vertical cross section of a vibration damper constructed according to a first embodiment of the invention.

Referring first to FIG. 1, there is shown a vibration-damping device in the form of a vibration damper 10 constructed according to a first embodiment of the present invention. The vibration damper 10 includes a housing having a hollow structure in the form of a housing member 12 having an inner space 14 as a hollow space, and a mass member 16 which is accommodated within the inner space 14. The vibration damper 10 is installed on a vibrative member, e.g., a body of an automotive vehicle (not shown) such that the housing member 12 is bolted to the vibrative member. The vibration damper 10 is installed so as to damp input vibrations which are applied primarily in a vertical direction as seen in FIG. 1, or in a direction almost parallel to the vertical direction. It is appreciated that the words "upper" and "lower" or "upward" and "downward" will be generally used to indicate vertically upper and lower positions or directions of the components or parts of the vibration damper 10 as seen in FIG. 1.

The housing member 12 includes a body member 18 and a covering member 20. The body member 18 has a circular cup-shaped member or a hollow cylindrical member with a bottom wall. The covering member 20 is a thin-circular plate member, and is superposed on and fixed by welding to the axially upper end face of the body member 18, so as to close the opening of the body member 18. With the body member 18 and the covering member 20 assembled together to form the housing member 12, there is formed the inner space 14 having a cylindrical shape. The bottom wall of the body member 18 has a thin-disk shape, and has a circular opening 22 formed through its central portion, so that the inner space 14 of the housing member 12 is open to the atmosphere through the circular opening 22. In other words, the bottom wall of the body member 18 formed with the circular opening 22 serves as an annular support plate 24 which is integrally formed at and protrudes radially inwardly from an axially lower end portion of a cylindrical wall portion of the body member 18. The inner surface of the housing member 12, which defines the inner space 14, serves as an abutting portion of the housing member 12. It is noted that the housing member 12 is fixed to the vibrative member, so that the abutting portion of the housing member 12 function as an abutting portion of the vibrative member.

The housing member 12 further includes an outward flange 26 integrally formed in the axially lower end portion of the body member 18. The outward flange 26 protrudes axially downwardly and radially outwardly from the lower end portion of the cylindrical wall portion of the body member 18, so that the annular support plate 24 is located axially upwardly of the protruding end portion of the outward flange 26. A plurality of threaded holes 27 are formed through the protruding end portion of the outward flange 26. The thus constructed housing member 12 is fixed to the vibrative member (not shown) such that the outward flange 26 is superposed on and bolted to the vibrative member by mounting bolts screwed in the threaded holes 27.

An elastic wall 28 as an elastic member is disposed in the circular opening 22 of the bottom wall of the body member 18, so as to serve as a first abutting part of the abutting portion of the housing member 12. More specifically described, the elastic wall 28 is a disk-shaped member with a generally constant thickness and is formed of a rubber elastic body. The elastic wall 28 extends in its horizontal attitude and is bonded at its peripheral portion to a substantially entire surface area of the annular support plate 24 upon vulcanization of a rubber material to form the elastic wall 28. Thus, the elastic wall 28 is fixedly supported at its peripheral portion by the annular support plate 24 over its entire circumference, such that the elastic wall 28 extends in its horizontal attitude without any slack. In this condition, the circular opening 22 is fluid-tightly closed by the elastic wall 28. Namely, the housing member 12 constructed as described above has the inner space 14 enclosed by the housing body 18, the covering member 20 and the elastic wall 28.

According to the present embodiment, the elastic wall 28 may be formed of a rubber elastic body having a Shore D hardness of 80 or smaller, more preferably within a range of 20–40, as measured in accordance with ASTM method D 2240. Such a rubber elastic body may be formed of known rubber materials selected depending upon operation condition of the vibration damper 10, e.g., may be formed solely of natural rubber, styrene-butadiene rubber, isoprene rubber, acrylonitrile-butadiene rubber, chloroprene rubber or butyl rubber, or may be formed of mixture of two or more of the above-indicated rubbers.

Within the inner space 14, the mass member 16 is accommodated such that the mass member 16 is non-adhesive to and is displaceable independent of and relative to the housing member 12. The mass member 16 is a solid spherical member formed mainly of a metallic material. An abutting layer 34 as an elastic abutting layer made of a rubber material or an elastomer is formed on and secured to the entire surface of the mass member 16. The abutting layer 34 has a generally constant thickness over its entire area. The abutting layer 34 may have a Shore D hardness of 80 or smaller, more preferably within a range of 20–40, preferably as measured in accordance with ASTM method D 2240, i.e., as measured in its surface. It is noted that the abutting layer 34 or a surface of the mass member 16 serves as an abutting portion of the mass member 16.

The size of the mass member 16 is dimensioned such that the mass member 16 is opposed to an inner surface of the housing member 12 with a spacing therebetween over its entire surface, when the mass member 16 is located in a central portion of the inner space 14. In this condition, the spacing formed between the mass member 16 and the housing member 12 is made minimum at portions: (1) where the diametrically central portion of the covering member 20 and the surface of the mass member 16 are opposed to each other in the vertical direction; (2) where the diametrically central portion of the elastic wall 28 and the surface of the mass member 16 are opposed to each other in the vertical direction; and (3) where the axially central portion of the cylindrical wall portion of the body member 18 and the surface of the mass member 16 are opposed to each other in the horizontal direction. Such a minimum spacing: $\delta$ is preferably held within a range of 0.05–0.8 mm, more preferably 0.05–0.5 mm. In a static state of the vibration damper 10 as shown in FIG. 1, where the housing member 12 is not subjected to a vibrational load, the mass member 16 is held in contact with the elastic wall 28 of the housing member 12 due to the gravity acting thereon, and is spaced apart from the cylindrical wall portion of the body member 18 with a spacing: $\delta$ therebetween, while being spaced apart from the covering member 20 with a spacing: $2\delta$, e.g., 0.1–1.6 mm, more preferably 0.1–1.0 mm.

The vibration damper 10 constructed as described above is installed on the vehicle such that the housing member 12 is fixedly bolted to the vibrative member of the vehicle. With the vibration damper 10 installed in position, a vibrational load is applied to the vibration damper 10 primarily in the vertical direction as seen in FIG. 1. The mass member 16 accommodated within the inner space 14 of the housing member 12 fixed to the vibrative member, is forced to move into and impact on and bounce off the housing member 12 in the vibration input direction, i.e., in the vertical direction, resulting in a reciprocating displacement or a bouncing displacement of the mass member 16 within the inner space 14. This bouncing displacement of the mass member 16 within the inner space 14 primarily excites impact of the mass member 16 on the first abutting part of the abutting portion of the housing member 12, i.e., the elastic wall 28 and a second abutting part of the abutting portion of the housing member 12, i.e., the covering member 20. Therefore, the vibration damper 10 exhibits an excellent damping effect with respect to vibrations excited to the vibrative member, on the basis of the impact of the mass member 16 on the housing member 12 including the elastic wall 28. It is appreciated that the first and the second abutting parts of the abutting portion of the housing member 12 constitute a first and a second abutting parts of the vibrative member.

In the vibration damper 10 of the present embodiment, the first abutting part of the abutting portion of the housing member 12 is located on the side of the vibrative member and is formed of the elastic wall 28, which is fixedly supported at its peripheral portion by the housing member 12. Upon impact of the mass member 16 on the elastic wall 28, an impact load of the mass member 16 is applied to the elastic wall 28 in a direction perpendicular to the diametric direction of the elastic wall 28, that is, in the vertical direction as seen in FIG. 1. Thus, the elastic wall 28 is elastically deformed primarily in a direction in which the elastic wall 28 undergoes shear deformation.

When the mass member 16 is brought into impact on the elastic wall 28 as the abutting portion of the housing member 12, the vibration damper 10 exhibits low dynamic spring constant based on the shear deformation of the elastic wall 28. Accordingly, a resonance-like peak of the damping effect of the vibration damper 10 based on the impact of the mass member 16 on the housing member 12 is tunable to a low frequency band, whereby the vibration damper 10 is capable of exhibiting a high damping effect with respect to vibrations within a low frequency band.

In the vibration damper 10 constructed according to the present embodiment, the elastic wall 28 is formed to undergo shear deformation in the direction in which the impact load of the mass member 16 is applied. This arrangement makes it possible to enlarge the amplitude of reciprocating displacement of the mass member 16 relative to the housing member 12, on the basis of the resonance-like effect of the reciprocating displacement of the mass member 16 within the housing member 12, even in the case where the low frequency vibrations with a small vibrational energy is applied to the vibration damper 10. This arrangement therefore effectively facilitates the bouncing displacement of the mass member 16 within the inner space 14 upon application of the vibrational load to the vibration damper 10. For instance, the vibration damper 10 may be subjected to vibrations having an acceleration of 1 G (i.e., a gravity acceleration) or lower. Even in this case, the vibration damper 10 permits an excellent bouncing displacement of the mass member 16 relative to the housing member 12, thereby exhibiting the damping effect based on the impacts of the mass member 16 on the housing member 12. Thus, the vibration damper 10 is capable of exhibiting its excellent vibration damping effect based on the impact of the mass member 16 against the housing member 12 with respect to vibrations having small energy like the vibrations excited in the automotive vehicle.

Further, the vibration damper 10 exhibits the low dynamic spring characteristic when the mass member 16 is forced to move into impact against the elastic wall 28 as the first abutting part of the abutting portion of the housing member 12. This makes it possible to tune a resonance frequency or the peak of the damping effect of the vibration damper 10 based on the impacts of the mass member 16 on the housing member 12 to a low frequency band. Therefore, the vibration damper 10 can be made compact, without requiring a large-sized mass member.

Figure 2:
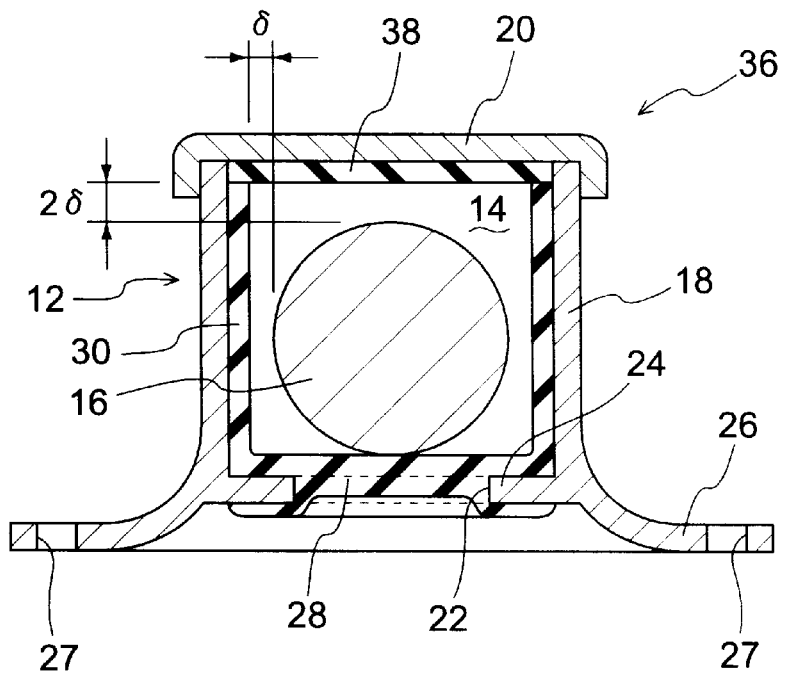
FIG. 2 is an elevational view in vertical cross section of a vibration damper constructed according to a second embodiment of the invention.

Referring next to FIG. 2, there is shown a vibration-damping device in the form of a vibration damper 36 constructed according to a second embodiment of the present invention. The same reference numerals as used in the first embodiment will be used in this second embodiment, to identify the functionally corresponding or structurally similar elements, which will not be described in detail to avoid redundancy of description.

The vibration damper 36 according to the present embodiment is different from the vibration damper (10) in that the inner surface of the cylindrical wall portion of the body member 18 is covered with an elastic layer in the form of a first rubber layer 30 formed over its entire area, while a part of the lower surface of the covering member 20, which part defines partially the inner space 14 is covered with an elastic layer in the form of a second rubber layer 38 formed over its entire area. The vibration damper 36 is also different from the vibration damper (10) in that the mass member 16 is made solely of a metallic material, and does not have the abutting layer (34) formed on and bonded to the surface thereof.

Described in detail, the first rubber layer 30 is formed on and bonded to the inner surface of the cylindrical wall portion of the body member 18 such that the first rubber layer 30 extends with a substantially constant thickness over the entire area thereof. The first rubber layer 30 is integrally formed with the elastic wall 28, and is bonded to the inner surface of the cylindrical wall portion of the body member 18 upon vulcanization of a rubber material for forming the first rubber layer 30. The second rubber layer 38 is formed on the part of lower surface of the covering member 20 over its substantially entire area with a substantially constant thickness that is equal to that of the first rubber layer 30. In the present embodiment, the peripheral portion of the covering member 20 is bent downwardly to be calked against the open-end portion of the body member 18, so that the covering member 20 and the body member 18 are fixed to each other.

The vibration damper 36 constructed as described above is installed in the vibrative member of the vehicle, like the vibration damper (10) according to the first embodiment of the invention. When a vibration to be damped is applied to the vibration damper 36 in the vertical direction as seen in FIG. 2, the mass member 16 accommodated within the inner space 14 of the housing member 12 fixed to the vibrative member is forced to move into and impact against the abutting portion of the housing member 12 including the elastic wall 28 in the vibration input direction, resulting in the reciprocating or bouncing displacement of the mass 16 within the inner space 14 due to the impact of the mass member 16 on the abutting portion of the housing member 12. Therefore, the vibration damper 36 exhibits an excellent damping effect, based on the impact of the mass member 16 on the housing member 12, like the vibration damper (10) of the first embodiment.

In the vibration damper 36 of the present embodiment, the inner surfaces of the cylindrical wall portion of the body member 18 and the part of the lower surface of the covering member 20 (i.e., the inner surface of the housing member 12) are both covered with the first and second rubber layers 30, 38, respectively. Therefore, the mass member 16 has no need to be covered with the abutting layer (34), unlike the vibration damper (10) of the first embodiment, resulting in improved production efficiency.

Figure 3:
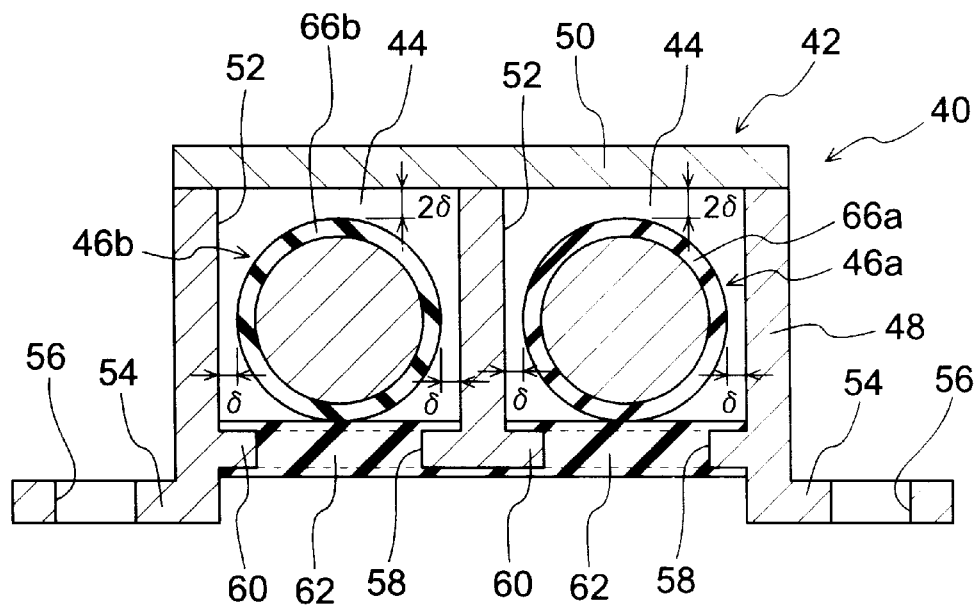
FIG. 3 is an elevational view in vertical cross section of a vibration damper constructed according to a third embodiment of the invention.

Referring next to FIG. 3, there is shown a vibration-damping device in the form of a vibration damper 40 constructed according to a third embodiment of the invention. The vibration damper 40 includes a housing having a hollow structure in the form of a housing member 42 having inner spaces 44, 44 as hollow spaces, and mass members 46a, 46b accommodated within the inner spaces 44, 44, respectively. The vibration damper 40 is installed on the vibrative member of the vehicle, like the vibration damper (10) of the first embodiment. The vibration damper 40, which is installed in position, receives a vibrational load primarily in the vertical direction as shown in FIG. 3, which substantially parallel to the vertical direction.

The housing member 42 includes a body member 48 and a covering member 50. The body member 48 is a generally rectangular block member formed of a rigid material such as a synthetic resin and an aluminum alloy. The body member 48 has cavities 52, 52 open in the upper surface thereof and being independent of each other. Each of the cavities 52, 52 extends straightly in the vertical direction as seen in FIG. 3 with a constant circular cross section. The each cavity 52 is dimensioned to have a depth equal to a diameter thereof. Namely, the cavities 52, 52 are equal to each other in size and formed in respective portion of the body member 48 such that center axes of these cavities 52, 52 extend parallel to each other.

The body member 48 of the housing member 42 has a pair of fixing plates 54, 54 integrally formed at lower end portions of longitudinally opposite side walls thereof, respectively. Each of the fixing plates 54, 54 protrudes downwardly by a slight distance from the lower end portion of the corresponding side wall, and is then bent so as to extend outwardly from the lower end portion of the corresponding side wall. Thus, the housing member 42 is fixed at the fixing plates 54, 54 to the vibrative member by mounting bolts screwed in the threaded holes 56, 56. In this condition, a lower surface of the body member 48 is spaced apart from the vibrative member (not shown).

The covering member 50 is a rectangular flat-plate member whose top plane configuration corresponds to a top plane configuration of the body member 48. The covering member 50 is formed of a rigid material like the body member 48. The covering member 50 is superposed on and fixed by welding or by a suitable fastening means such as bolts to the open-end face of the body member 48.

Each of the cavities 52, 52 of the body member 48 has a bottom wall formed with a circular opening 58. The circular opening 58 is coaxial with the corresponding cavities 52, while having a diameter smaller than an inner diameter of the corresponding cavities 52. Namely, the bottom wall of the each cavity 52 serves as an annular support plate 60 protruding radially inwardly from an inner surface of a cylindrical wall portion of the cavity 52. The circular opening 58 formed through the bottom wall of the each cavity 52 is closed by an elastic wall 62 serving as a first abutting part of an abutting portion of the housing member 42.

Described in detail, each elastic wall 62 is a disk-shaped member with a substantially constant thickness and is formed of a rubber elastic body. The each elastic wall 62 disposed in the circular opening 58 of the corresponding cavity 52 such that the elastic wall 62 extends in a direction perpendicular to an axis of the circular opening 58. The each elastic wall 62 is bonded at its peripheral portion to a substantially entire surface area of the corresponding annular support plate 60 upon vulcanization of a rubber material to form the elastic wall 62. Thus, the elastic walls 62, 62 are fixedly supported at their peripheral portions by the respective annular support plates 60, 60 over their entire circumference, such that the elastic walls 62, 62 extend in their horizontal attitudes without any slack. The circular openings 58, 58 of the cavities 52, 52 are fluid-tightly closed by the elastic walls 62, 62, whereby fluid-tightly enclosed inner spaces 44, 44 are formed within the housing member 42, such that the inner spaces 44, 44 are independent of each other.

Each of the elastic wall 62, 62 may be formed of a rubber elastic body having a Shore D hardness of 80 or smaller, more preferably within a range of 20–40, as measured in accordance with ASTM method D 2240, preferably, like the elastic wall (28) of the vibration damper (10) of the first embodiment.

On the other hand, the mass members 46a, 46b both have a solid spherical shape and are mainly formed of a metallic material. Namely, the mass members 46a, 46b include metallic spherical core members and abutting layers 66a, 66b as an elastic abutting layers, which are formed on and secured to the entire surfaces of the core members, respectively. The abutting layers 66a, 66b may be formed of different rubber elastic bodies or elastomers, while having a generally constant thickness over its entire area, for example. The abutting layers 66a, 66b may preferably have a Shore D hardness of 80 or smaller, more preferably within a range of 20–40, at their surfaces in which the mass members 46a, 46b are brought into abutting contact with the housing member 42. It should be appreciated that elastic properties or elastic characteristics of the abutting layers 66a and 66b are made different from each other in the present embodiment.

The thus formed mass members 46a, 46b are accommodated within the respective inner spaces 44, 44 of the housing member 42. Since the properties of the abutting layers 66a and 66b are different from each other, as described above, the mass members 46a, 46b have different spring constants at their abutting portions with respect to the housing member 42. The thus formed mass members 46a, 46b are accommodated within the respective inner spaces 44, 44 of the housing member 42, such that the mass members 46a, 46b are non-adhesive to and spaced apart from the inner surface of the housing member 42 with a spacing over the entire surfaces thereof, when the mass member are located in the central portion of the inner spaces 44, 44, like the vibration damper (10) of the first embodiment. Thus, the mass members 46a, 46b are displaceable independently of the housing member 42 within the respective inner spaces 44, 44. In this respect, the minimum spacing: δ is preferably held within a range of 0.05–0.8 mm, like the vibration damper (10).

In a static state of the vibration damper 40 shown in FIG. 3, where the housing member 42 is not subjected to the vibration of the vibrative body, the mass members 46a, 46b are held in contact with the elastic walls 62, 62, respectively, due to the gravity acting thereon. In the static state, the abutting portion of the mass members 46a, 46b are spaced apart from the respective inner circumferential surfaces of the cavities 52, 52 with a spacing: δ, e.g., 10.05–0.8 mm, more preferably 0.05–0.5 mm therebetween, while being spaced apart from the covering member 50 with a spacing: 2 δ, e.g., 0.1–1.6 mm, more preferably 0.1–1.0 mm, like in the vibration damper (10) of the first embodiment. Accordingly, the mass members 46a, 46b are reciprocally movable within the inner space 44, 44 by a distance of 0.1 mm–1.6 mm in the vertical and the horizontal direction, as seen in FIG. 3.

The vibration damper 40 constructed as described above is installed on the vibrative member of the vehicle such that the housing member 42 is bolted to the vibrative member. With the vibration damper 40 installed in position, a vibrational load to be damped is primarily applied in the vertical direction into the vibration damper 40 as seen in FIG. 3. Upon application of a vibrational load to the vibration damper 40 in the vertical direction, the mass members 46a, 46b accommodated within the housing member 42 fixed to the vibrative member are forced to move into and impact on and bounce off the housing member 42 repeatedly, resulting in the reciprocating or bouncing displacement of the mass members 46a, 46b within the inner spaces 44, 44, while being independent of the housing member 42, exciting impact of the mass members 46a, 46b on the abutting surface of the housing member 42 including the elastic walls 46, 46. Thus, the vibration damper 40 exhibits an excellent vibration damping effect due to the impact of the mass members 46a, 46b primarily on the elastic walls 62, 62 as the first abutting part of the abutting portion of housing member 42 and the covering member 50 as the second abutting part of the abutting portion of the housing member 42, like the vibration damper (10) of the first embodiment.

It is appreciated that the abutting layers 66a, 66b formed on the respective mass members 46a, 46b are made different from each other in terms of their elastic properties so that the mass members 46a, 46b have different spring constants at their abutting portions with respect to the housing member 42. This arrangement facilitates to tune the mass members 46a, 46b such that the reciprocating displacements of the mass members 46a, 46b exhibit resonance-like effects in different frequency bands. Accordingly, the vibration damper 40 is capable of exhibiting an excellent damping effect with respect to various kinds of vibrations over a wide frequency band or different frequency bands, e.g., engine shakes, engine idling vibrations, and booming noises.

Figure 4:
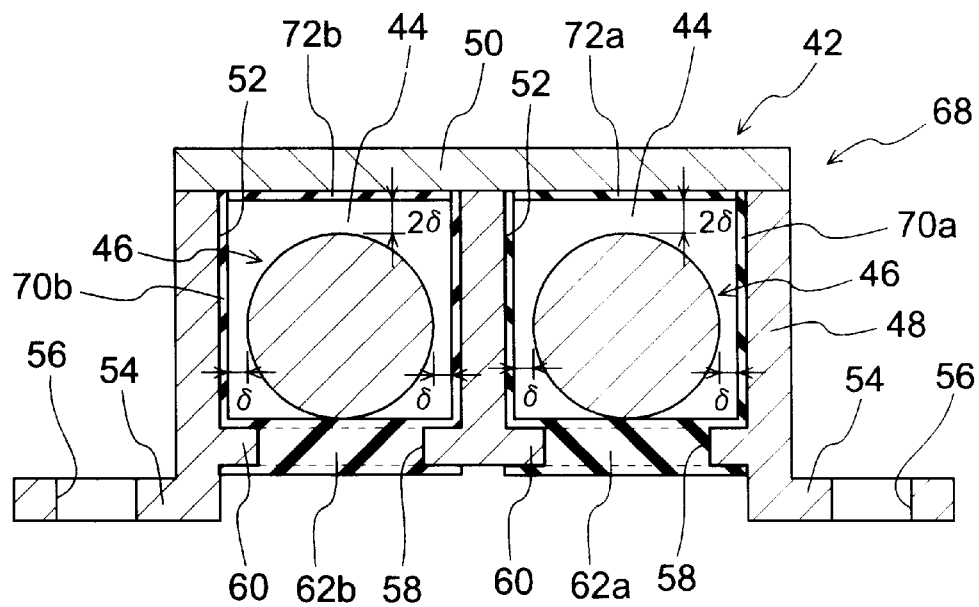
FIG. 4 is an elevational view in vertical cross section of a vibration damper constructed according to a fourth embodiment of the invention.

Referring next to FIG. 4, there is shown a vibration-damping device in the form of a vibration damper 68 constructed according to a fourth embodiment of the present invention. The same reference numerals as used in the third embodiment will be used in this fourth embodiment, to identify the functionally corresponding or structurally similar elements, which will not be described in detail.

The vibration damper 68 is different from the vibration damper (40) of the third embodiment in that the elastic walls 62a, 62b are formed of different elastic bodies so that they are different from each other in terms of the elastic properties thereof, and in that the inner circumferential surfaces of the cavities 52, 52 are entirely covered with an elastic layer in the form of first rubber layer 70a, 70b, while the respective parts of lower surfaces of the covering member 50, which cooperate to define the respective inner spaces 44, 44, are entirely covered with the elastic layer in the form of second rubber layers 72a, 72b. That is, the abutting portion of the housing member 42 is entirely covered with the rubber layers 70a, 70b, 72a, 72b and the elastic walls 62a, 62b. The vibration damper 68 is also different from the vibration damper (40) in that the mass members 46, 46 are formed of a metallic material, entirely, without being covered with the abutting layers (66a, 66b).

Described in detail, the elastic walls 62a, 62b are made different in their elastic properties, resulting in different spring constants of the abutting part of the abutting portion of the housing member 42 with respect to the mass members 46, 46. The first rubber layers 70a, 70b are formed on and bonded to entire areas of the inner circumferential surfaces of the cavities 52, 52 with a substantially constant thickness, and while the second rubber layers 72a, 72b are formed on the respective parts of the lower surface of the covering member 50 with a substantially constant thickness, upon vulcanization of a rubber material for forming the first and second rubber layers 70a, 70b, 72a, 72b. In the present embodiment, the first rubber layers 70a, 70b may be integrally formed with the respective second rubber layers 72a, 72b in the above-mentioned vulcanization process. In this respect, the rubber material for forming the rubber layers 70a, 70b may be or alternatively may not be the same as the rubber material for forming the elastic walls 62a, 62b. It should be noted that the thickness of the peripheral portions of the elastic walls 62a, 62b, which is formed on and secured to the upper surfaces of the annular support plates 60, 60, are made equal to the thickness of the first rubber layers 70a, 70b, while the thickness of the first rubber layers 70a, 70b are made equal to that of the second rubber layers 72a, 72b.

The vibration damper 68 constructed as described above is installed in position, like the vibration damper (40) of the third embodiment, so that a vibrational load to be damped is applied to the vibration damper 68 primarily in the vertical direction. Upon application of a vibrational load to the vibration damper 68, the mass members 46, 46 accommodated within the inner spaces 44, 44 of the housing member 42, are forced to move into and impact on and bounce off the housing member 42 within the inner spaces 44, 44, while being independent of the housing member 42, exciting impact of the mass members 46, 46 on the elastic walls 62, 62 as the first abutting parts and other abutting parts of the abutting portion of the housing member 42. Thus, the vibration damper 68 exhibits an excellent vibration damping effect on the basis of the impact of the mass members 46, 46 on the abutting portion of the housing member 42 including the elastic walls 62, 62.

In particular, the elastic walls 62a, 62b are made different from each other in terms of the elastic properties thereof, as described above, whereby the first abutting parts of the abutting portion of the housing member 42 with respect to the respective mass members 46, 46 have different spring constants. This arrangement facilitates to tune the reciprocating displacement of the mass members 46, 46 to exhibit resonance-like effect with respect to different frequency vibrations. Therefore, the vibration damper 68 of the present embodiment is capable of exhibiting an excellent vibration damping effect with respect to vibrations within a plurality of frequency bands or over a wide frequency band.

Figure 5:
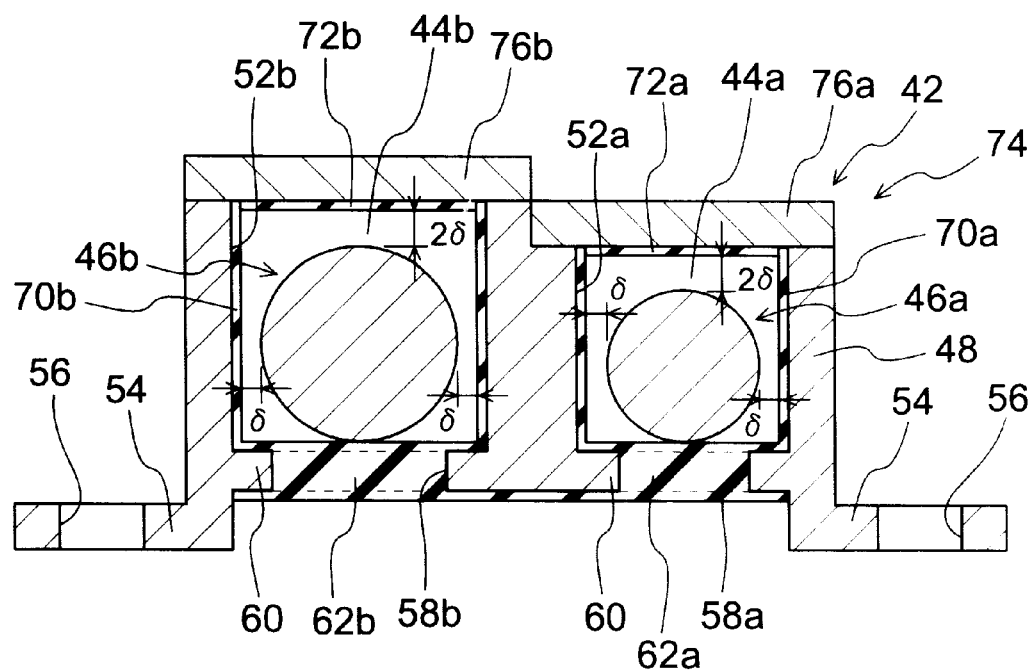
FIG. 5 is an elevational view in vertical cross section of a vibration damper constructed according to a fifth embodiment of the invention.

Referring next to FIG. 5, there is shown a vibration-damping device in the form of a vibration damper 74 constructed according to a fifth embodiment of the invention. The same reference numerals as used in the fourth embodiment will be used in this fifth embodiment, to identify the functionally corresponding or structurally similar elements, which will not be described in detail.

The vibration damper 74 of the present embodiment is different from the vibration damper (68) according to the fourth embodiment in that the inner spaces 44a, 44b of the housing member 42 are different in size from each other, and the mass members 46a, 46b are different in size and mass, accordingly. In this embodiment, the elastic walls 62a, 62b, which are disposed in the respective circular openings 58a, 58b of the housing member 42 are formed of a same elastic material, while being different from each other in terms of a dynamic spring constant which will be described later.

Described more specifically, the body member 48 has a large thickness portion and a small thickness portion located on the longitudinally opposite sides thereof, so that a shoulder is formed on the upper surface of the body member 48 as seen in FIG. 5. The cavity 52a formed in the small thickness portion has a depth which is smaller than that of the cavity 52b formed in the large thickness portion. The cavity 52a has a diameter that is equal to the depth thereof, while the cavity 52b has a diameter that is equal to the depth thereof. The mass members 46a, 46b are respectively dimensioned so that the mass members 46a, 46b are accommodated within the respective inner spaces 44a, 44b with a predetermined spacing therebetween, like in the illustrated embodiments. Accordingly, the mass members 46a, 46b are different in size. Since the mass members 46a, 46b are made of the same metallic material, so that the mass members 46a, 46b have different masses. In the present embodiment, the covering member 76 is divided into two members, namely, a covering member 76a, and a covering member 76b. These covering members 76a, 76b are superposed on and fixed to the open end faces of the small thickness portion and the large thickness portion of the body member 48, respectively, thereby fluid-tightly closing the openings of the cavities 52a, 52b.

The vibration damper 74 constructed according to the present embodiment is installed in position, like the vibration damper (40) of the third embodiment. Upon application of a vibrational load in the vertical direction as viewed in FIG. 5, the mass members 46a, 46b are bouncingly and reciprocally displaced within the respective inner spaces 44a, 44b, while being independent of the housing member 42, exciting impact of the mass members 46a, 46b on the abutting portion of the housing member 42 including the elastic walls 62a, 62b. Thus, the vibration damper 74 is capable of exhibiting vibration-damping effect on the basis of impact of the mass members 46a, 46b on the abutting portion of the housing member 42 including the elastic walls 62a, 62b, like the illustrated embodiments.

In the vibration damper 74, particularly, the mass members 46a, 46b have different masses, respectively. This arrangement facilitates to tune the reciprocating displacements of the mass members 46a, 46b so as to exhibit resonance-like effects in the different frequency bands. Thus, the vibration damper 74 exhibits an excellent vibration damping effect with respect to vibrations within a plurality of different frequency bands or over a wide frequency band.

In particular, the mass member 46a has the volume which is made smaller than that of the mass member 46b, while the elastic wall 62a, has a dynamic spring constant which is made larger than that of the elastic wall 62b, since the free length of the elastic wall 62a, is made smaller than that of the elastic wall 62b due to the difference of diameters of the openings 58a, 58b. Therefore, the vibration damper 74 exhibits a desired damping effect based on the impacts of the mass member 46b on the housing member 42, with respect to vibrations whose frequency band is lower than the frequency band of vibrations to which the vibration damper 74 exhibits a desired damping effect based on the impacts of the mass members 46a on the housing member 42.

While the presently preferred embodiments of the invention have been described above in detail for illustrative purpose only, it is to be understood that the invention is not limited to the details of these illustrated embodiments, but may be modified with various changes, modifications and improvements.

For instance, the configurations of the mass member(s) and the housing member do not limited to those in the illustrated embodiments, but may be selected from various kinds of configurations.

In the illustrated embodiments, the elastic walls 28, 62 serving as the first abutting parts of the abutting portions of the housing members 12, 42 are disposed in vertically lower portions of the housing members 12, 42. These elastic walls 28, 62 may be disposed in vertically upper portions of the housing members 12, 42, instead of or in addition to the lower portions of the housing members 12, 42. Each elastic wall may have a desired spring constant.

In the vibration damper 68 according to the fourth embodiment of the invention, the elastic walls 62a, 62b are formed of the different rubber elastic body so that the elastic walls 62a, 62b as the abutting portions of the housing member 42 have different spring constants. The invention may otherwise be embodied in order to achieve the different spring constants of the abutting parts of the housing member. For instance, the wall thickness of the elastic walls 62a, 62b are made different from each other so that the elastic walls 62a, 62b have different spring constants with the same material.

The number of the mass members independently accommodated within the housing is not limited to the illustrated embodiment. For instance, three or more mass members may be accommodated within the housing, while being independent of one another. In this case, the mass members may be arranged to have different masses or sizes, or different spring constants of the abutting portions thereof. It is also possible to arrange the abutting portions of the housing, on which the mass members are brought into impact, respectively, to have different spring constants.

In the vibration damper 74 of the fifth embodiment, the mass members 46a, 46b have different masses. The masses of the mass members may otherwise be varied. For instance, the mass members may be formed of different materials to have different masses. Alternatively, one of the mass members has a solid structure, while the other of the mass member has a hollow structure, thereby varying their masses.

In the illustrated embodiment, each inner space of the housing member accommodates a single mass member. The present invention may otherwise be embodied such that the each inner space accommodates a plurality of mass members. In this case, the mass members are arranged in parallel with each other in a vibration input direction within the inner space, preferably.

It is to be understood that the present invention may be embodied with various other changes, modifications, and improvement which may occur to those skilled in the art, without depending from the spirit and scope of the invention defined in the following claims:

What is claimed is:

1. A vibration-damping device for damping vibrations of a vibrative member of a vehicle, comprising:
   a rigid housing having a hollow structure and being fixable to the vibrative member, said housing defining a hollow space therein; and
   a mass member being accommodated within said hollow space with a spacing therebetween such that said mass member is non-adhesive to and is displaceable independent of and relative to said housing,
   said housing partially defined by an elastic member to provide an abutting portion of said housing on which an abutting portion of said mass member is brought into impact,
   at least one of said abutting portions of said mass member and said housing being formed of an elastic member adapted to undergo shear deformation due to a load applied thereto in a direction in which said mass member and said housing are brought into impact against each other.

2. A vibration-damping device according to claim 1, wherein said mass member is mainly formed of a metallic material, and said housing having an inner surface covered with an elastic layer formed integrally with said elastic member.

3. A vibration-damping device according to claim 1, wherein said housing comprises a housing member formed independently of and fixed to the vibrative member, said housing member having a cylindrical hollow space and having a bottom wall partially defining said cylindrical hollow space and formed of said elastic member, said mass member having a spherical shape and accommodated within said cylindrical hollow space of said housing member with a spacing therebetween such that said mass member is non-adhesive to and is displaceable independent of and relative to said housing member, said mass member being brought into impact on said elastic member in a direction in which a vibrational load is applied to said vibration-damping device so that said elastic member undergoes shear deformation.

4. A vibration-damping device according to claim 1, wherein said mass member comprises a plurality of mass members which are independent of each other and which have respective masses different from each other.

5. A vibration-damping device according to claim 1, wherein said mass member comprises a plurality of mass members which are independent of each other, and said housing comprises a plurality of said abutting portions on which said plurality of mass members are brought into impact, respectively, each of said plurality of abutting portions of the housing including a first abutting part which is formed of said elastic member, a plurality of said first abutting parts formed of said elastic members on which said plurality of mass members are brought into impact, respectively, having different spring constants.

6. A vibration-damping device according to claim 1, wherein said housing comprises a housing member formed independently of and fixed to the vibrative member, said housing member having a plurality of cylindrical hollow spaces and having bottom walls partially defining said plurality of cylindrical hollow spaces and formed of said elastic members, respectively, said mass member having a plurality of mass members each having a spherical shape and accommodated within the corresponding hollow space of said housing member with a spacing therebetween such that said mass member is non-adhesive to and is displaceable independent of and relative to said housing member, said plurality of mass members being brought into impact on said elastic members in a direction in which a vibrational load is applied to said vibration-damping device so that said elastic member undergoes shear deformation.

7. A vibration-damping device according to claim 1, wherein said mass member has a mass within a range of 10–1000 g as measured in a single body thereof.

8. A vibration-damping device according to claim 1, wherein said abutting portion of the vibrative member includes a first and a second abutting parts which are opposed to each other in a vibration input direction with said mass member interposed therebetween, and said mass member is brought into impact on said first and second abutting parts of said abutting portion of the vibrative member, said mass member being reciprocally displaceable between said first and second abutting parts by a distance of 0.1–1.6 mm as measured in said vibration input direction.

9. A vibration-damping device according to claim 8, wherein at least one of said first and second abutting parts of said abutting portion of the vibrative member is formed of said elastic member.

10. A vibration-damping device according to claim 1, wherein at least one of surfaces of said abutting portions of the vibrative member and said mass member has a Shore D hardness of not greater than 80.

11. A vibration-damping device according to claim 1, wherein a total mass of said mass member is held within a range of 5–10% of a mass of the vibrative member.

12. A vibration-damping device according to claim 1, wherein said mass member includes an elastic abutting layer formed on and bonded to a surface thereof.

13. A vibration-damping device according to claim 1, wherein at least one of said abutting portions of said mass member and the vibrative member have a modulus of elasticity within a range of $1-10^4$ MPa.

14. A vibration-damping device according to claim 1, wherein at least one of said abutting portions of said mass member and the vibrative member has a loss tangent of not less than $10^{-3}$.

15. A vibration-damping device according to claim 1, wherein said housing is at least partially constructed by the vibrative member.

* * * * *